United States Patent [19]

Rasmussen et al.

[11] Patent Number: 5,301,247
[45] Date of Patent: Apr. 5, 1994

[54] METHOD FOR ENSURING SECURE COMMUNICATIONS

[75] Inventors: Harry R. Rasmussen, Tacoma; Jack D. LaBounty, Bellevue; Michael J. Rosenow, Issaquah, all of Wash.

[73] Assignee: Crest Industries, Inc., Pacific, Wash.

[21] Appl. No.: 918,364

[22] Filed: Jul. 23, 1992

[51] Int. Cl.$^5$ .............................................. H04K 1/00
[52] U.S. Cl. ...................................... 380/43; 380/21; 380/46; 380/47; 380/48
[58] Field of Search .................. 380/21, 23, 28, 29, 380/43, 45, 47, 48, 46

[56] References Cited

U.S. PATENT DOCUMENTS

| | | | |
|---|---|---|---|
| 4,218,582 | 8/1980 | Hellmann et al. | |
| 4,677,670 | 6/1987 | Henderson, Jr. | 380/23 |
| 4,771,429 | 9/1988 | Davis et al. | 380/48 X |
| 4,771,462 | 9/1988 | Hannan et al. | 380/44 |
| 4,809,327 | 2/1989 | Shima | 380/44 |
| 4,876,716 | 10/1989 | Okamoto | 380/21 |
| 4,888,802 | 12/1989 | Cooney | 380/49 |
| 4,910,776 | 3/1990 | Dyke | 380/25 |
| 4,985,919 | 1/1991 | Naruse et al. | 380/18 |
| 5,001,750 | 3/1991 | Kato et al. | 380/18 |
| 5,003,597 | 3/1991 | Merkle | 380/37 |
| 5,073,935 | 12/1991 | Pastor | 380/30 |
| 5,081,678 | 1/1992 | Kaufman et al. | 380/21 |
| 5,146,498 | 9/1992 | Smith | 380/21 |
| 5,204,901 | 4/1993 | Hershey et al. | 380/21 |
| 5,222,136 | 6/1993 | Rasmussen et al. | 380/43 X |
| 5,222,141 | 6/1993 | Killian | 380/48 X |

OTHER PUBLICATIONS

Schneier, B., "Untangling Public-Key Cryptography," *Dr. Dobb's Journal*, May 1992, 8 pages.

*Primary Examiner*—Tod R. Swann
*Attorney, Agent, or Firm*—Christensen, O'Connor, Johnson & Kindness

[57] ABSTRACT

A method for initiating secure communications between two stations. In this method, a first portion of a session data encryption key (DEK1) is randomly generated by an EDU in one of the stations. The DEK1 is then encrypted using a key exchange key (KEK) selected from a table as a function of a check value determined by applying the DEK1 to encrypt a predefined zero function. The encrypted DEK1 is transmitted to the other station, along with an encrypted EDU ID number for the station that generated the DEK1 and a cyclic redundancy check (CRC) value of the KEK table. The encrypted table entry value used to define the KEK is decrypted at the other station, and a check is made to determine if the KEK table CRC and the EDU ID are correct. If not, communication is terminated. Otherwise, the second portion of the data encryption key (DEK2) is generated by the station that received the first portion, and encrypted by it using a different KEK value selected from the table for transmission to the other station, along with the EDU ID of the station then transmitting. The encrypted DEK2 is decrypted at the other station and a check made of the EDU ID. Both stations logically XOR the values of DEK1 and DEK2 together to determine the session data encryption key (DEK), which is used to encrypt and decrypt all further transmissions between the two stations during the current session.

20 Claims, 5 Drawing Sheets

METHOD FOR ENSURING SECURE COMMUNICATIONS

FIELD OF THE INVENTION

The present invention is generally related to a method for encrypting and decrypting communications between two stations, and more specifically, to a method for determining an encryption key that will be used by the stations to respectively encrypt and decrypt the communications.

BACKGROUND OF THE INVENTION

Procedures for encrypting and decrypting data for transmission over non-secure radio or telephone links have been highly defined to meet the needs of the military and industry. A Data Encryption Algorithm (DEA) that is virtually unbreakable in any reasonable time frame, by even the most powerful of high-speed computers, has been developed and published by U.S. National Bureau of Standards and sanctioned for use by industry in this country as an acceptable method for protecting computerized data. In fact, integrated circuits designed specifically for encryption and decryption of data in accordance with this DEA are readily available from several vendors, such as Western Digital TM. The algorithm, like most encryption schemes, uses an encryption key to encrypt data. Successful use of the DEA or almost any other encryption/decryption algorithm requires that the station receiving the encrypted transmission have the same encryption key used to encrypt the data in order to decrypt it and that no unauthorized party knows the encryption key that is being used.

Unfortunately, in any art encryption/decryption system using the DEA or similar methods, extensive security measures are required for managing and periodically changing the encryption keys that are used. Any third party that gains access to the encryption key being used to encrypt data can easily decrypt messages that are intercepted by tapping into any non-secure line over which encrypted messages are transmitted. Even if knowledge of the encryption key used is limited to those requiring the information to run the encryption/decryption equipment, there can be no assurance that others outside the organization will not learn the encryption key due to failure to follow security procedures. As the size of a network over which secure communications must be maintained expands, the difficulty in managing the encryption keys used by the network members grows exponentially.

Any person with access to the encryption keys can breach the security of encrypted communications between members of the organizational network. Encryption keys must therefore be changed on a regular basis to minimize the risk of disclosure by individuals that previously had access to the keys, and any such change requires that the new encryption keys be distributed to all stations in the network. Typically, the new encryption keys are hand carried to each station site by bonded couriers. However, it is possible that the courier may compromise security. Even if a security breach does not occur, the cost of regularly distributing encryption keys to each station of a large network in this manner may be prohibitive.

Ideally, data encryption/decryption apparatus used at each station should establish a secure communications link with another station automatically, without need for significant operator interaction or special cryptographic training of the operators. The encryption key used for each communication session should preferably be randomly selected for each communication session, eliminating the need to periodically distribute new encryption keys to each station of the network. The encryption/decryption apparatus should enable secure encrypted communications only with a specific intended station, precluding any like apparatus from being used to reroute the communications by tapping into the non-secure communications line linking the stations. None of the prior art encryption/decryption apparatus or methods for establishing secure communications provide these or any equivalent set of advantages and features.

The foregoing aspects and many other attendant advantages of this invention compared to previous methods for establishing secure communication between parties using encryption/decryption schemes will be more readily appreciated as the same becomes better understood by reference to the following detailed description, when taken in conjunction with the accompanying drawings.

SUMMARY OF THE INVENTION

In accordance with the present invention, a method for defining an encryption key (for a single session) that is used to encrypt and decrypt transmissions between two stations comprises the steps of randomly selecting a first part encryption key at one of the stations and a second part encryption key at the other station. The first part encryption key is encrypted at the station where it was randomly generated and is transmitted in encrypted form to the other station. The other station decrypts the first part encryption key and encrypts the second part encryption key, which is then transmitted in encrypted form to the one station, where it is decrypted. Both stations combine the first part and second part encryption keys to determine the encryption key that is used to encrypt and decrypt further communications between the two stations during the current session.

The steps of encrypting the first part encryption key and the second part encryption key include the steps of selecting a first key exchange key (KEK) and a second KEK, respectively. Each KEK is selected from a predefined table of keys that is common to both of the stations. The steps of selecting the first and second KEKs include the steps of determining a first and a second table entry value for the predefined table by using the first and the second part encryption keys to encrypt a predefined set of characters, respectively. The encrypted predefined set of characters define the first and the second table entry values for selecting the first and the second KEKs from the predefined table.

The first table entry value is transmitted to the other station with the encrypted first part encryption key and the other station uses the first table entry value to determine the first KEK and transmits the second table entry value to the one station, where the second table entry value is used to determine the second KEK. The first part encryption decrypted at the other station is validated by using it to encrypt the predefined set of characters and comparing the value determined by that encryption with the first entry value. If that value differs from the table entry value, an error is detected. Similarly, at the one station, the second part encryption key that was decrypted is validated by using it to encrypt the predefined set of characters and comparing the resulting value to the second table entry value. If the resulting value differs from the second table entry value, an error is detected.

The method further includes the steps of storing a unique station identification code for the other station internally within a module so that the identification code can not be altered. This unique station identification code need not be secret. The one station encrypts its station identification code and transmits the encrypted station identification code to the other station. The other station then decrypts the station identification code that it received in encrypted form and compares it with the station identification code for the one station. If there is a difference, communications between the two stations are halted. Thus, the two stations can not establish secure communications if their station identification codes do not match the expected station identification codes.

DETAILED DESCRIPTION OF THE PREFERRED EMBODIMENT

Figure 1:
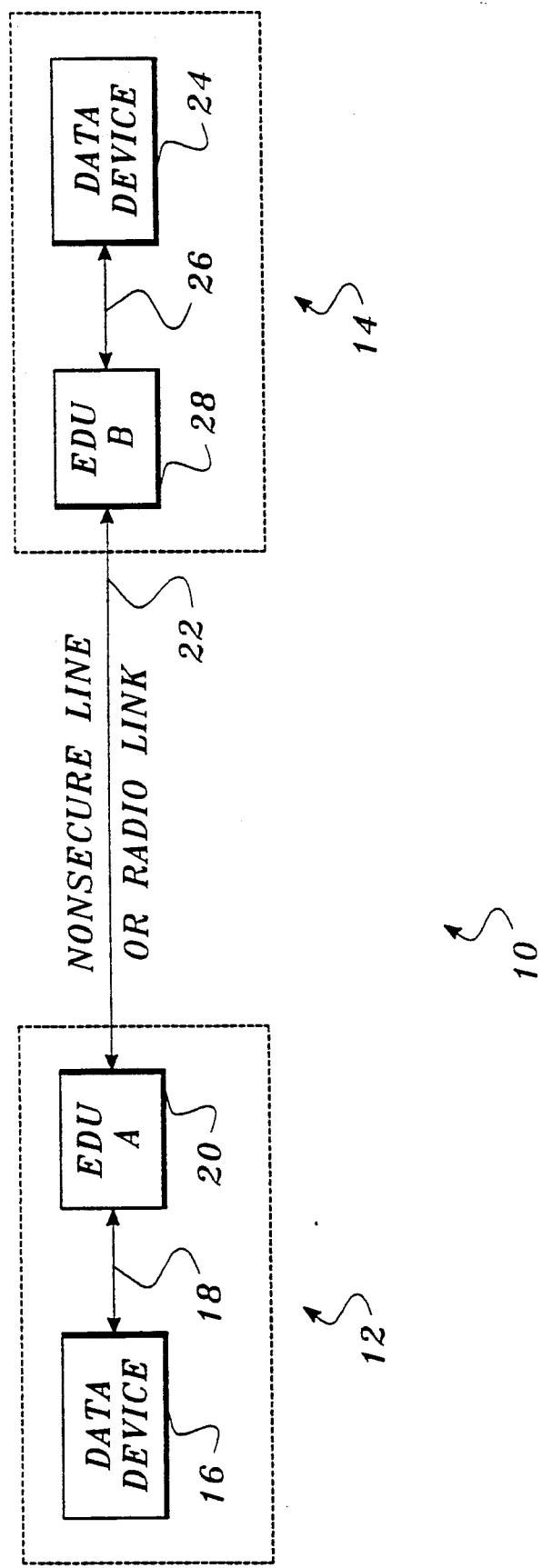
FIG. 1 is a block diagram of a communications network comprising two stations, each provided with an encryption/decryption unit (EDU) for practicing the method in accordance with the present invention, thereby enabling the stations to establish secure communications over a non-secure line or radio link.

As noted above, one of the more difficult problems in establishing and maintaining an encrypted communication network is distributing secure data encryption keys to each station in the network on a regular basis. In FIG. 1, a simple network for carrying out encrypted communications is shown generally at reference numeral 10. Only a station 12 and a station 14 of network 10 are shown, but it will be appreciated that the network can comprise many other such stations.

Both stations 12 and 14 use similar components for encrypting and decrypting communications. For example, station 12 includes a data device 16, which may, for example, comprise a facsimile machine or personal computer (neither shown separately). Data device 16 is connected through lines 18 to an EDU A 20, which carries out the method for establishing secure communications with another such device over a non-secure line (or radio link) 22. Non-secure line 22 is connected to an EDU B 28, which is connected to a data device 24 over lines 26. Data device 24 is the same type of device as data device 16. Thus, if data devices 16 and 24 are facsimile machines, network 10 permits secure communication of facsimile information in an encrypted form between stations 12 and 14 over non-secure line 22.

Because of the manner in which secure communications are established between EDU A 20 and EDU B 28, tapping into non-secure line 22 using a similar EDU (not shown) would not enable a third party to breach secure communications between stations 12 and 14. In the preferred form of the present invention, communications between EDU A 20 and EDU B 28 are carried out using a session encryption key that is changed with each session and comprises two parts, one part randomly selected by EDU A 20 and the other part randomly selected by EDU B 28. Thus, the present invention provides a method for the EDU at each of the communicating stations 12 and 14 to randomly select its respective portion of the session encryption key, to encrypt that portion of the session encryption key, and to transmit the encrypted respective portion of the session encryption key to the other station. Once both station 12 and station 14 have decrypted the portion of the session encryption key developed by the other station, the two portions are logically combined in an exclusive OR (XOR) operation to produce the complete or final session data encryption key that will be used for encrypting data transmitted between stations 12 and 14 during the current session. In addition, the method includes steps to ensure that the intended station in a two-way communication link is actually receiving or transmitting the encrypted data, to guard against a third party tapping into non-secure line 22 with another EDU. The method also checks whether the two portions of the session data encryption key that are exchanged between stations 12 and 14 have been correctly received and decrypted, thereby determining if data errors have arisen in the transmission of the encrypted portions of the session data encryption key between the two stations.

Figure 2:
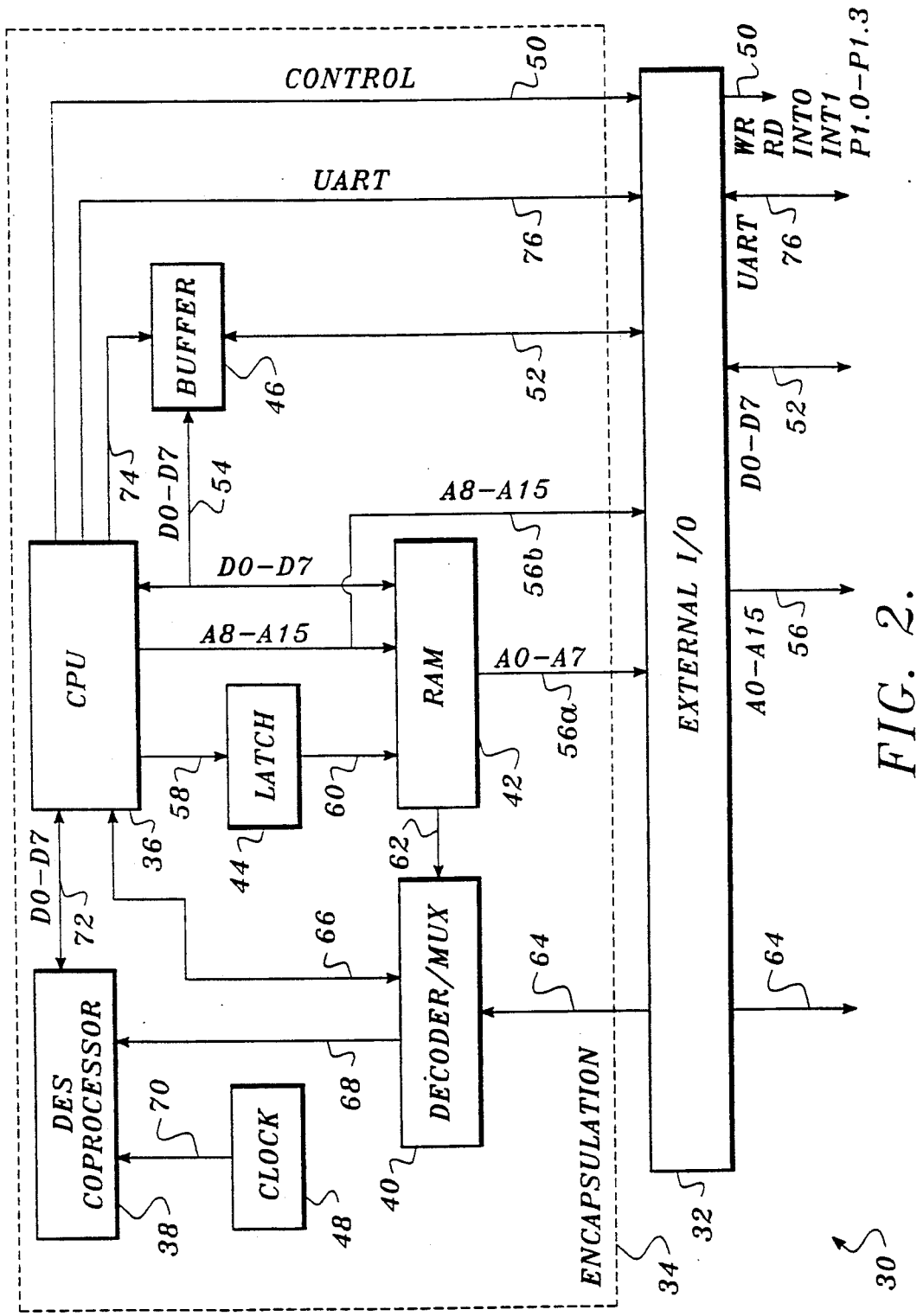
FIG. 2 is a schematic block diagram of one of the EDUs shown in FIG. 1.

A block diagram of EDU 20 is shown in FIG. 2; EDU 28 is exactly the same, except for having a different EDU identification number electronically stored within it. EDU 20 includes a potted module 30 and an external input/output (I/O) bus 32 for interconnection to the data device (or to any other components). Module 30, which comprises virtually the entire EDU, is encapsulated within a radio-opaque and light opaque potting compound 34 to prevent discovery of the internal circuitry and to prevent forced electromagnetic or visual tapping, monitoring, or other forms of penetration that might be attempted to learn or modify encryption keys and other data stored therein. Of greatest sensitivity and importance in maintaining the security of communications between EDUs comprising a network are the KEKs that are stored within each EDU in an encrypted form, using a key unique to the EDU that is assigned and stored within it when the KEKs are initialized and stored. The KEKs are used for encrypting portions of the session encryption key that are exchanged between two stations and subsequently logically combined at each EDU to produce a complete or final session encryption key that is used for encryption of data exchanged over non-secure line 22. It is absolutely imperative that these KEKs not become publicly known to avoid breaching secure communications between the EDUs.

In the preferred form of module 30, two sets or tables of KEKs are stored in encrypted form in a random access memory (RAM) 42. One set is called a "public" set, since each EDU that will be sold will include this set. The other set is a "private" set of KEKs, which optionally may be randomly generated by a user for distribution to and storage in those EDUs comprising a private network of stations. The significance of the KEKs will be apparent from the description that follows. Any attempt to expose the internal circuitry of module 30 by use of a chemical, solvent, or mechanical means in order to access RAM 42 electronically or physically so as to access these data will cause loss of the KEKs that are stored therein. RAM 42 preferably comprises a Dallas Semiconductor TM type DS 1213 smart socket in which is installed a memory integrated circuit (not separately shown) comprising 128 K×8 bits of storage, i.e., yielding 1,048,576 bits of non-volatile static RAM organized as 131,072 words by 8 bits. This memory integrated circuit is a dual in-line package (DIP) configuration of generally conventional design, but the smart socket contains an internal battery supply (not separately shown) sufficient to maintain data integrity in the absence of externally applied power for a period in excess of 10 years. Dallas Semiconductor also supplies an integrated circuit non-volatile memory device that includes an integral battery supply, and this type of device can be used in place of the smart socket and more conventional memory device combination. In the event a chemical solution is used to dissolve potting compound 34 in an attempt to discover the KEKs stored in RAM 142, the material comprising RAM 142 (smart socket or memory device that includes the integral internal battery supply) will also be dissolved, thereby disconnecting the internal battery supply and erasing the KEKs stored therein.

Operation of module 30 to establish and conduct secure communications is controlled by a CPU 36, which includes 32 K of embedded RAM (not separately shown). In the preferred embodiment, a Dallas Semiconductor TM type DS 5000 microchip integrated circuit is used for CPU 36. The DS 5000 integrated circuit includes non-volatile embedded RAM (not separately shown) and all information and programming stored therein are preserved in the absence of an externally applied voltage for up to 10 years. In addition, the internal data registers and key configuration registers of the DS 5000 integrated circuit are non-volatile. Data stored within the embedded RAM that comprise program steps carried out by CPU 36 in establishing secure communications can be modified after encapsulation of module 30 has been accomplished with potting material 34; however, initial loading of the embedded RAM within the DS 5000 microchip comprising CPU 36 is accomplished with a conventional universal asynchronous receiver/transmitter (UART) interface (not shown) that is connected through external I/O bus 32 by lines 76. In addition, control lines 50 connect CPU 36 to external I/O bus 32 and convey write, read, interrupt, and signals for ports 0-3 (P1.0-P1.3) of the CPU.

Data lines (D0-D7) 54 interconnect CPU 36 with RAM 42 and with a buffer 46. Buffer 46 comprises an SN 74HCT245 octal bus transceiver with a threestate output that is used to block external access to internal data transfers occurring within module 30, thereby preventing an external device from accessing KEKs stored in RAM 42 and other data transferred between components of the module. Buffer 46 is enabled via control signals supplied over a line 74 by CPU 36 when it is appropriate to allow bidirectional data transfer to and from external I/O bus 32 through lines 52, and therefore to and from an external device.

CPU 36 selects a specific KEK within RAM 42 by setting 16 address bits that define the starting point of the KEK. Lines 58 connect CPU 36 to a latch 44, and lines 60 connect latch 44 to RAM 42. To minimize the total number of pins required on CPU 36, the first eight address bits (A0-A7) and eight bits of data (D0-D7) use the same pins on CPU 36. These address bits and data are alternatively passed between CPU 36, latch 44, and RAM 42 over lines 58 and 60, respectively. The eight most significant bits of the address are conveyed on lines 56b directly from CPU 36 to RAM 42 and to external I/O bus 32. The least significant eight address bits (A0-A7) are carried on lines 56a. In the preferred embodiment, the 16 address bits are available on lines 56 at external I/O bus 32 to address the embedded RAM in CPU 36 when it is initially loaded or subsequently modified.

Although CPU 36 controls the operation of module 30, the actual encryption and decryption of data is implemented by a data encryption standard (DES) coprocessor 38. DES coprocessor 38 is designed to encrypt and decrypt 64-bit blocks of data using the algorithm specified in the Federal Information Processing Data Encryption Standard (No. 46). A transfer rate of 807 kilobytes per second is implemented by DES coprocessor 38 under the control of a 10 MHz clock circuit 48, to which the DES coprocessor is connected through lines 70. Data are transferred between CPU 36 and DES coprocessor 38 over lines 72. In the preferred embodiment, a Western Digital TM type DES WD20C03A integrated circuit is used for DES coprocessor 38; similar devices are available from other suppliers. A decoder/multiplexer (MUX 40) is connected through lines 68 to DES coprocessor 38 and through lines 66 to CPU 36. Decoder/MUX 40 is a three-line to eight-line circuit that decodes one of eight lines, dependent upon three binary select inputs and three enable inputs. Lines 66 carry the three binary select signals and the output signal from decoder/MUX 40 and line 68 carries selectable input 7. In addition, lines 62 carry selectable inputs 5 and 6 from RAM 42, while lines 64, which extend between decoder/MUX 40 and external I/O bus 32, convey selectable inputs 0-4.

The embedded non-volatile RAM in CPU 36 is loaded with the appropriate program steps for controlling the operation of EDU 20 at the time module 30 is manufactured. In addition, RAM 42 is loaded with a set of 65,535 public KEKs that are randomly generated from over 72 quadrillion possibilities. Each EDU that is thus produced stores the same table of 65,535 randomly generated public encryption keys. Any EDU can establish secure encrypted communications with any other EDU using the public KEKs. Also stored in RAM 42 is a user-generated table of over 65,535 randomly generated private encryption keys. These private KEKs are used for initiating secure communications with another EDU in the private network that has the same table of private KEKs stored within its RAM 42.

Figure 3:
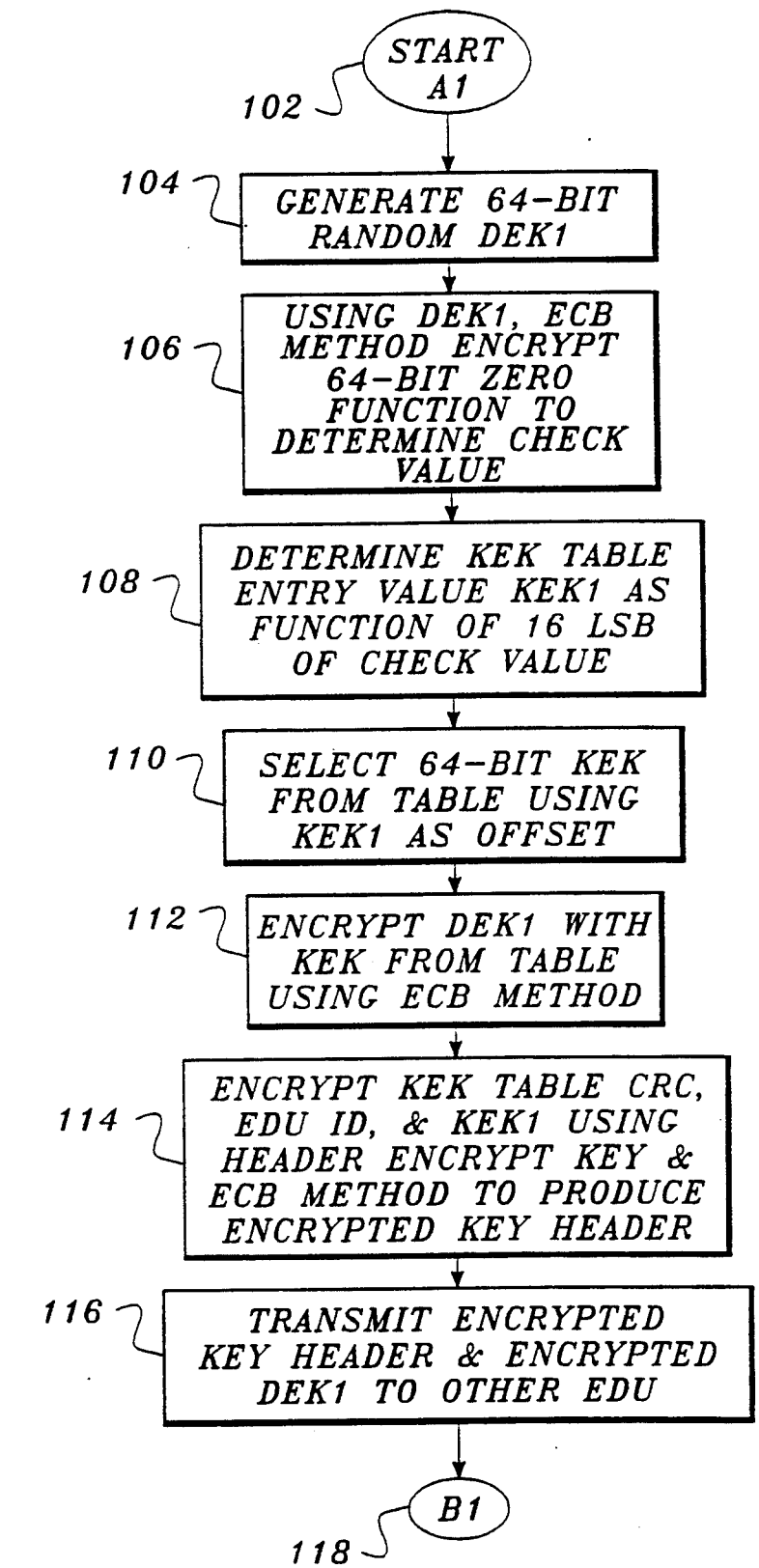
FIG. 3 is a flow chart illustrating the logical steps implemented at one station by the EDU in selecting and encrypting a first portion of a session encryption key for transmittal to another station.
Figure 4:
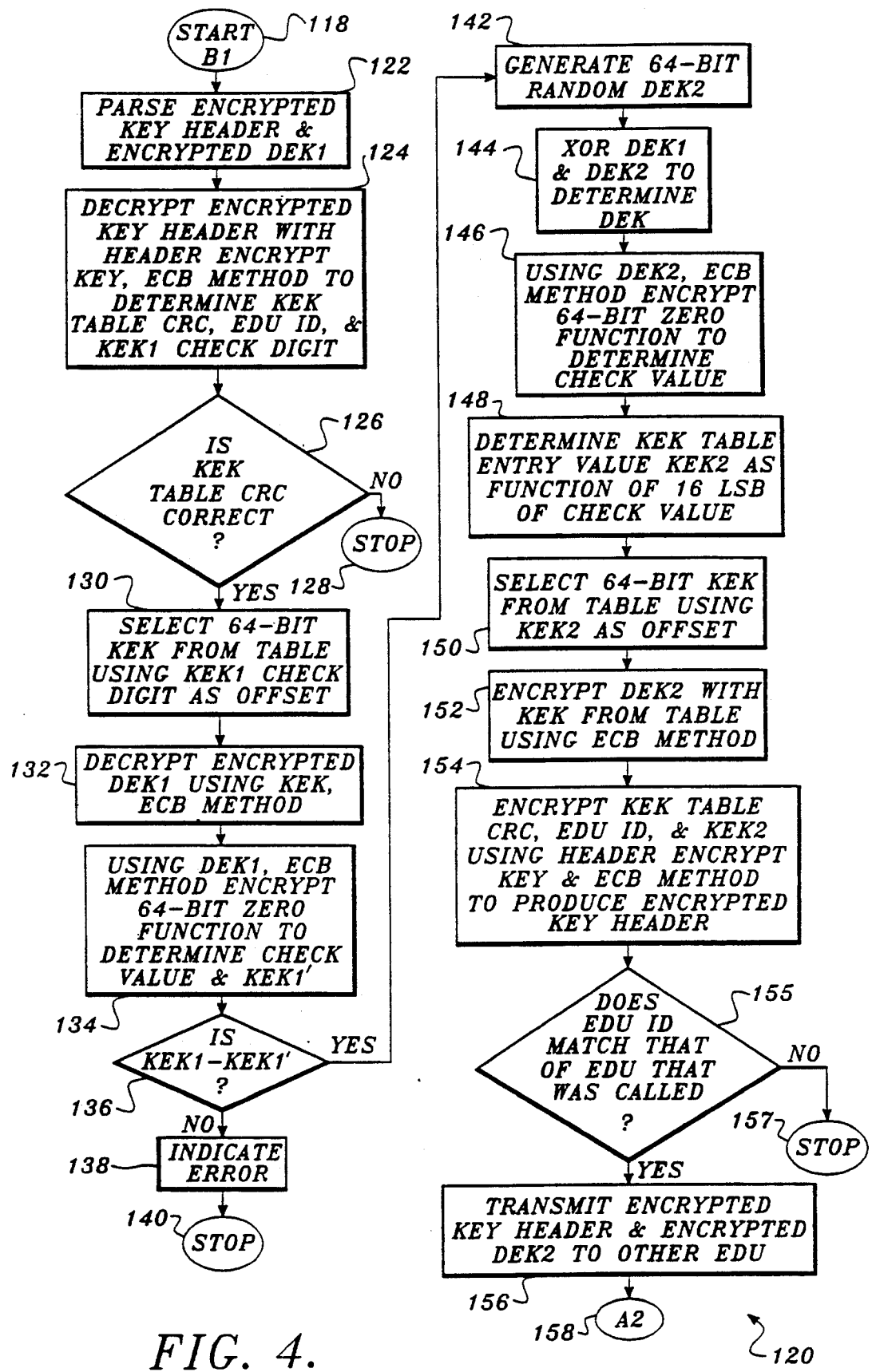
FIG. 4 is a flow chart illustrating the logical steps implemented by the EDU at the other station in decrypting the first portion of the session encryption key, and in selecting and encrypting a second portion of the session encryption key for transmittal to the one station.
Figure 5:
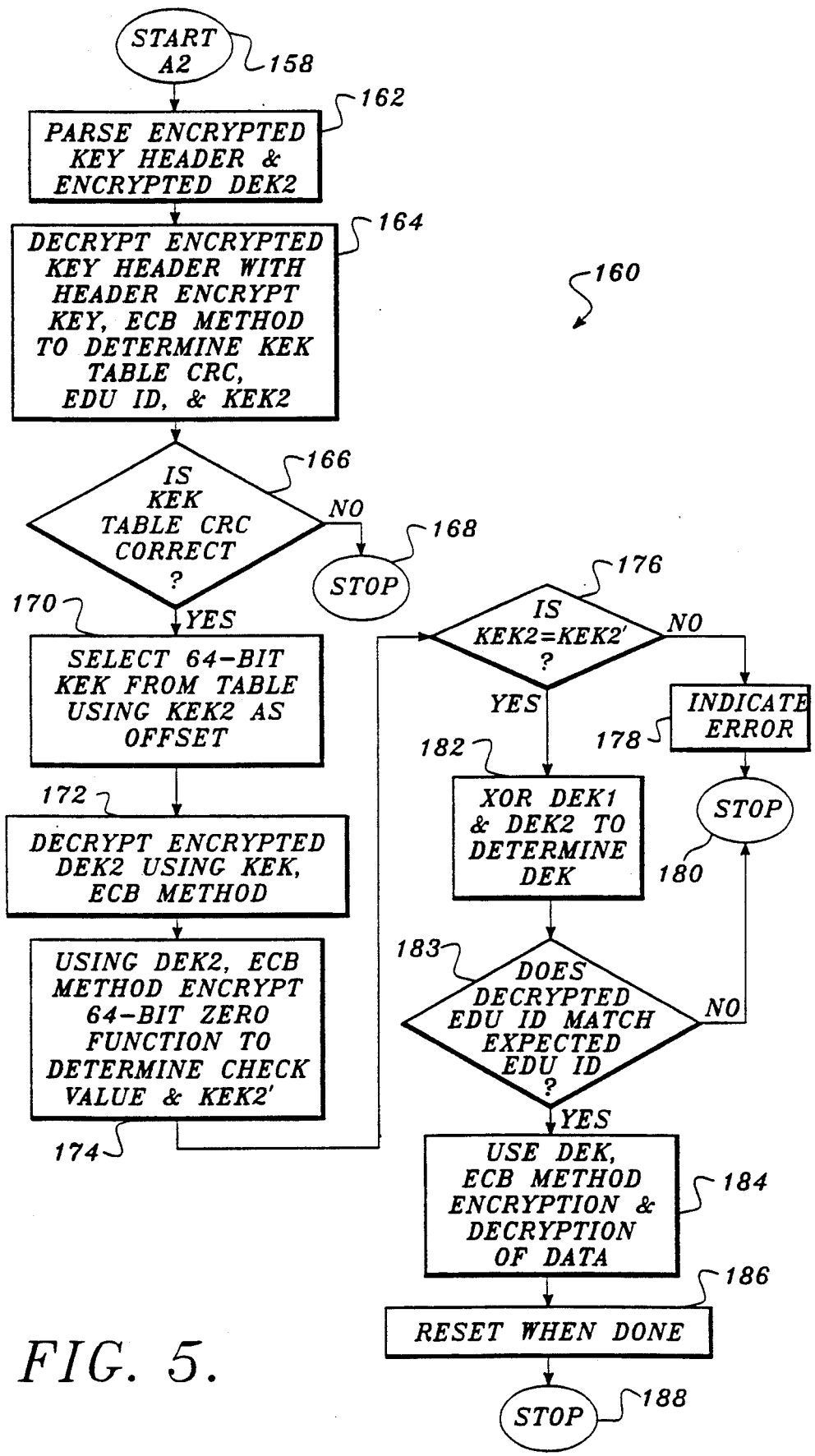
FIG. 5 is a flow chart illustrating the logical steps implemented by the EDU at the one station to decrypt the second portion of the session encryption key.

The steps involved in establishing secure communications between two EDUs are shown in FIGS. 3, 4, and 5. Not shown are any handshaking steps necessary to connect two EDUs in communication with each other so that data for a specific device can be transmitted between them. Preferably, such handshaking steps are implemented by transmitting predefined data blocks between the two devices, but do not necessarily require action by either EDU.

In FIG. 3, a flow chart 100 identifies the steps taken by EDU B 28, acting as the intended recipient, to establish secure communications. It will be apparent that the steps in flow chart 100 could also be carried out by EDU A 20; however, the choice was made in the preferred embodiment to have the receiving station start the process of determining a session data encryption key, thereby avoiding the possibility that a third party posing as another station might tap into the unsecured line with an EDU to initiate the secure communications link. The method begins with a start block 102. In a block 104, EDU B 28 generates a 64-bit random data encryption key 1 (DEK1), which is one of over 72 quadrillion possible data encryption keys (i.e., all possible combinations of 56 bits).

The DEK1 is the first portion of a session data encryption key that will be subsequently used for transmitting encrypted data between the two EDUs. In a block 106, EDU B 28 then uses the DEK1 as the encryption key in implementing the DEA to encrypt one block of data. The use of the DEA to encrypt a single block of data is referred to as an electronic code book (ECB) method and is carried out by DES coprocessor 38 under the control of CPU 36. The ECB method employs the key (DEK1) to encrypt a 64-bit zero function, i.e., a function comprising 64 logical zeros, the result being used to determine a check value.

In a block 108, a KEK table entry value KEK1 comprising the 16 least significant bits (LSBs) of the 64-bit check value from block 106 is determined. The EDU uses the public or private table for KEKs, as specified by EDU A 20 during the handshaking that preceded establishing the secure communications link. The public table and private table of KEKs each represent a linear array of data, that can be taken in groups of four 16-bit words or 64-bits at a time, to define a KEK. The 16 LSBs of the check value determine the starting point or table entry value in the selected table to determine the 64 bits used as a KEK, as indicated in a block 110. Using the 64-bit KEK selected from the table as the encryption key, the EDU encrypts the value DEK1 using the ECB method in a block 112. A cyclic redundancy check (CRC) value for the KEK table that was selected is then determined in the conventional manner.

In a block 114, the EDU encrypts the KEK table CRC, its own EDU ID number (which is stored in within module 30 and is not user modifiable), and the KEK1 entry value using a predefined header encryption key and the ECB method to produce an encrypted key header. The header encryption key is stored in the embedded RAM within CPU 36 at the time that its programming is initially loaded and is the same for each EDU. In a block 116, the EDU transmits the encrypted key header and encrypted DEK1 to EDU A 20, which initiated the communication. Although both parts of this transmission are encrypted, they are encrypted at different levels of security, since the encrypted key header is always sent encrypted with the same predefined (although inaccessible) key and the encrypted DEK1 uses a different key with virtually every communication session between two EDUs. The method for establishing secure communications continues with the other EDU, at a block B1 118.

In FIG. 4, a flow chart 120 shows the steps carried out by EDU A 20 (the EDU that initiated the communication). Flow chart 120 begins at block B1 118 and proceeds to a block 122 wherein the encrypted key header and encrypted DEK1 received from EDU B 28 are parsed. In a block 124, the encrypted key header is decrypted using the predefined header encryption key with the ECB method, enabling the EDU to determine the KEK table CRC, the encoded EDU ID number of the EDU that transmitted the encrypted header, and KEK1.

A decision block 126 causes the CPU to determine if the KEK table CRC is correct, thereby ensuring that the KEK table used to encrypted the header is the same as the KEK table that will be used by EDU A 20. This step prevents two EDUs from attempting to communicate if they are using different private KEK tables or if the public table in use by one has become corrupted or is different than the normal public table of KEKs for some other reason. If the CRC value does not match the expected value, a block 128 stops communication between the EDUs. Under most circumstances, however, the KEK table CRC is correct and the logic proceeds to a block 130.

In block 130, EDU A 20 determines the 64-bit KEK that was previously selected from the public or private table by EDU B 28, using the KEK1 value that it just received as an offset to enter the table. The 64-bit KEK is then used with the ECB method to decrypt the value DEK1, as shown in a block 132.

In a block 134, a validity check is made to ensure that the decryption process was carried out correctly and that the encrypted data were not affected by noise or other problems during transmission. The validity check is carried out by using the decrypted DEK1 value and the ECB method to encrypt the 64-bit zero function. The result provides a check value, the 16 LSBs of which are a value KEK1'. The accuracy of the encryption/decryption process and transmission is confirmed in a decision block 136 if the EDU determines that KEK1 equals KEK1'. If not, a block 138 provides for indicating that an error has occurred in establishing secure communications, which leads to a stop block 140.

On the other hand, assuming that KEK 1 equals KEK 1', a block 142 directs the EDU to generate a 64-bit random value, DEK2, which is the second portion of the session data encryption key that will be used to encrypt data transmissions between the two EDUs. In a block 144, EDU A 20 performs a logical XOR to combine the first portion of the session key, DEK1, and the second portion, DEK2, to determine the final session data encryption key DEK.

In a block 146, DEK2 is used with the ECB method to encrypt the 64-bit zero function in order to determine a second check value. Using the 16 LSBs of the check value in a block 148, the EDU determines a table entry value KEK2. By entering the specified public or private table at the address offset determined by KEK2, four consecutive 16-bit words comprising a 64-bit KEK are determined in a block 150. The EDU uses the value of the KEKs from the table and the ECB method to encrypt DEK2 in a block 152.

With the predefined header encryption key, the EDU A 20 encrypts the KEK table CRC, its own EDU ID, and the table entry value KEK2, producing an encrypted key header in a block 154. The encrypted key header just produced and the encrypted DEK2 will be transmitted to EDU B 28 only if the next test is passed in a decision block 155.

Decision block 155 now determines whether the EDU ID that was decrypted from the header received from EDU B 28 in block 124 matches that of the EDU that was initially called, i.e., confirms that the intended recipient has responded. Since the encryption of the EDU ID is carried out automatically by EDU B 28, and can not be modified or affected by external signals, it is virtually impossible for a third party to use another EDU to break into a communications link and take part in establishing secure communications, since the encrypted EDU ID that is returned to the station that initiated the communication would then not match the expected EDU ID. A negative response to decision block 155 causes the process for establishing secure communications to be halted at a stop block 157. Otherwise, the process for establishing a secure communications link proceeds to a block 156. Block 156 provides for transmitting the encrypted key header and encrypted DEK2 to the other EDU, i.e., to EDU B 28, which is the intended recipient for subsequent encrypted communications. Thereafter, the logic proceeds to a block A2 158 in FIG. 5.

FIG. 5 illustrates a flow chart 160 defining the steps next implemented by EDU B 28. Following block 158, a block 162 provides for parsing the encrypted key header and encrypted DEK2. The encrypted key header is then decrypted in a block 164 using the ECB method in connection with the predefined header encryption key, enabling EDU B 28 to determine the KEK table CRC, the EDU ID of the transmitting station, and the KEK2 table entry value. In a decision block 166, EDU B 28 determines if the KEK table CRC value is correct, i.e., confirms that the public or private table of KEKs used by EDU A 20 is the same as that being used by EDU B 28. If not, the communication process is halted at a block 168. Otherwise, the process continues with a block 170.

Block 170 provides for selecting a 64-bit KEK from the designated table of KEKs using the entry value KEK2 as an offset. In a block 172, the EDU uses the selected KEK value in connection with the ECB method to decrypt the encrypted DEK2. It then performs a validity check in a block 174, by using the DEK2 value in connection with the ECB method to encrypt the 64-bit zero function, thereby determining a check value and a table entry value KEK 2' that is based upon the 16 LSBs of the check value. A decision block 176 causes CPU 36 to determine if the decrypted KEK2 equals KEK2' that was just determined in block 174. If not, a block 178 provides for indicating that an error has occurred, leading to a stop block 180.

However, assuming that the validity check has a positive response, in a block 182, the EDU logically XORs DEK1 and DEK2 to determine the value of DEK for this session. At this point, both the receiving and transmitting station EDUs have established the current session data encryption key DEK. Before the communication session can proceed, one final check is made in a decision block 183.

Decision block 183 determines if the EDU ID sent by EDU A 20 in the key header that was decrypted in block 164 by EDU B 28 matches an expected EDU ID. If not, block 180 stops the process of establishing secure communications between the two EDUs. Decision block 183 thus determines if a third EDU has been used to intercept communications between EDU A 20 and EDU B 28; if not, the communication of encrypted data proceeds at a block 184.

The session DEK is used in a block 184 by EDU A 20 to encrypt data (such as facsimile or computer data) for transmission to EDU B 28, which then decrypts it using the same DEK. When EDU B 28 determines that the last of the data to be transmitted has been received and decrypted, a block 186 provides for resetting both EDUs to await the next communication. Thereafter, a stop block 188 terminates further communication between the two stations.

During the process of establishing secure communications, neither of the EDUs linking together transmits DEK1 or DEK2 in the clear. Either the public or private table of KEKs is used for encrypting the first and second portions of the current session DEK. Consequently, only another EDU provided with the same control program and the same table of KEKs (producing the same CRC value) would be able to decrypt either the encrypted first or second portions of the DEK. Since the software program controlling the operation of the EDUs requires that the EDU ID number of the stations be encrypted as part of the key header information that is exchanged, a third EDU cannot be used to surreptitiously substitute for the intended receiving station or transmitting station during the establishment of the secure communication link. Consequently, only the two EDUs at the receiving and transmitting stations comprising a link are able to communicate to establish a session DEK and thereafter carry on secure communications.

Only an EDU having the same session DEK used to encrypt data can decrypt the data. Furthermore, although any EDU can establish secure communications with any other EDU using the public table of KEKs, only EDUs having the same private table of KEKs (determined from the KEK table CRC value) can establish a session DEK to communicate with each other. As a result, a corporation that generates its own table of private KEKs can ensure that secure communications are initiated only with other stations comprising its private network that include the same table of private KEKs.

While the DES algorithm is used in the preferred form of the present invention, it will be appreciated that other encryption algorithms that use an encryption key can also be employed. Further, when determining a check value, a predefined function other than the zero function can be used. It should also be apparent that the encrypted key header need not include the EDU ID, if a lower level of security is acceptable, for example, in a local network of EDUs exclusively using private KEKs. These and other modifications to the present invention will be apparent to those of ordinary skill in the art. Accordingly, it is not intended that the invention be in any way limited by the description of the preferred embodiment and modifications thereto, but instead that the scope of the invention be determined entirely by reference to the claims that follow.

The embodiments of the invention in which an exclusive property or privilege is claimed are defined as follows:

1. A method for defining an encryption key that is used to encrypt and decrypt transmissions between two stations, comprising the steps of:
   (a) randomly selecting a first part encryption key at one of the stations and a second part encryption key at the other station;
   (b) encrypting the first part encryption key at said one station;
   (c) transmitting the encrypted first part encryption key to the other station;

(d) decrypting the first part encryption key at said other station;
(e) encrypting the second part encryption key at said other station;
(f) transmitting the encrypted second part encryption key to said one station;
(g) decrypting the second part encryption key at said one station; and
(h) combining the first part and the second part encryption keys at each station to determine the encryption key, which is then used to encrypt and decrypt further communications between the two stations.

2. The method of claim 1, wherein the steps of encrypting the first part encryption key and the second part encryption key include the steps of selecting a first key exchange key and a second key exchange key, respectively, each key exchange key being selected from a predefined table of keys that is common to both of the stations.

3. The method of claim 2, wherein the steps of selecting the first and the second key exchange keys from the predefined table of keys include determining a first and a second table entry value for the predefined table by using the first and the second part encryption keys to encrypt a predefined set of characters, respectively, the encrypted set of characters defining the first and the second table entry values for selecting the first and second key exchange keys from the predefined table.

4. The method of claim 3, further comprising the steps of:
transmitting the first table entry value to said other station with the encrypted first part encryption key, wherein the step of decrypting the first part encryption key comprises the step of using the first table entry value to determine the first key exchange key; and
transmitting the second table entry value to said one station with the encrypted second part encryption key, wherein the step of decrypting the second part encryption key comprises the step of using the second table entry value to determine the second key exchange key.

5. The method of claim 4, further comprising the steps of:
(a) validating the first part encryption key decrypted at said other station by using it to encrypt the predefined set of characters;
(b) comparing a value determined therefrom with the first table entry value, whereby if said value differs from the first table entry value, an error is detected;
(c) validating the second part encryption key decrypted at said one station by using it to encrypt the predefined set of characters; and
(d) comparing a value determined therefrom with the second table entry value, whereby if said value differs from the second table entry value, an error is detected.

6. The method of claim 1, further comprising the steps of:
(a) storing a unique station identification for said other station internally within it so that the identification can not be altered, said identification being known to at least said one station;
(b) encrypting said station identification at said one station using the first key exchange key;
(c) transmitting the encrypted station identification with the encrypted first part encryption key to said other station;
(d) decrypting the station identification at said other station;
(e) comparing the decrypted station identification of said other station with the station identification stored within said other station; and
(f) halting communications if the decrypted station identification does not match the station identification stored within said other station.

7. A method for ensuring secure communications between a first cryptographic encoder/decoder device and a second cryptographic encoder/decoder device, comprising the steps of:
(a) at the first cryptographic encoder/decoder device:
(i) randomly generating a first part session encryption key;
(ii) determining a first check value as a function of the first part session encryption key;
(iii) encrypting the first part session key using a first key exchange key selected as a function of the first part session key;
(iv) transmitting the encrypted first part session key and the first check value to the second cryptographic encoder/decoder device; and
(b) at the second cryptographic encoder/decoder device:
(i) determining the first key exchange key at the second cryptographic encoder/decoder device as a function of the first check value;
(ii) decrypting the first part session key with the first key exchange key;
(iii) randomly generating a second part session key at the second cryptographic encoder/decoder device;
(iv) encrypting the second part session key using a second key exchange key selected as a function of the second part session key;
(v) transmitting the encrypted second part session key and the second check value to the first cryptographic encoder/decoder device; and
(c) at the first cryptographic encoder/decoder device:
(i) determining the second key exchange key as a function of the second check value;
(ii) decrypting the second part session key with the second key exchange key; and
(d) at both the first and the second cryptographic encoder/decoder devices, determining a session key for encrypting and decrypting transmissions during a current communication session by combining the first and the second part session keys.

8. The method of claim 7, wherein the steps of randomly generating the first part session key and the second part session key each comprise the step of generating a key using a random plural-bit process conforming to a data encryption algorithm that defines a data encryption standard promulgated by the U.S. government.

9. The method of claim 7, wherein the first key exchange key is selected from a table of key exchange keys entered with the first check value used as an index that uniquely defines a specific key exchange key from the table, and wherein the second key exchange key is selected from the table of key exchange keys entered with the second check value used as an index that uniquely defines a specific key exchange key from the table.

10. The method of claim 7, wherein the step of determining the first check value includes the step of encrypting a predefined set of characters with the first part session key, and wherein the step of determining the second check value includes the step of encrypting the predefined set of characters with the second part session key.

11. The method of claim 10, further comprising the steps of:
(a) at the second cryptographic encoder/decoder device:
   (i) using the first part session key that was decrypted with the first key exchange key to encrypt the predefined set of characters to obtain a test first check value;
   (ii) comparing the test first check value with the first check value that was transmitted to the second cryptographic encoder/decoder device; and
   (iii) detecting an error if the test first check value is not identical to the first check value received by the second cryptographic encoder/decoder device; and
(b) at the first cryptographic encoder/decoder device:
   (i) using the second part session key that was decrypted with the second key exchange key to encrypt the predefined set of characters to obtain a test second check value;
   (ii) comparing the test second check value with the second check value that was transmitted to the first cryptographic encoder/decoder device; and
   (iii) detecting an error if the test second check value is not identical to the second check value received by the first cryptographic encoder/decoder device.

12. The method of claim 11, further comprising the step of terminating communications between the first and second cryptographic encoder/decoder devices if an error is detected in either step (a)(iii) or in step (b)(iii) of that claim.

13. The method of claim 7, further comprising the step of selecting a key exchange key table from among a plurality of key exchange tables for use in selecting the first and the second key exchange keys.

14. The method of claim 7, wherein the steps of determining the first and the second check value each comprise the steps of encrypting a block of characters using the first and the second part session keys, respectively, and then converting a portion of a result to a plurality of equivalent ASCII value.

15. A method for ensuring secure communications between a first cryptographic encoder/decoder device and a second cryptographic encoder/decoder device, comprising the steps of:
(a) at the first cryptographic encoder/decoder device:
   (i) randomly generating a first part session encryption key;
   (ii) selecting a first key exchange from a predefined table of encryption keys entered with at least one check character that is determined as a function of the first part session key and a predefined alphanumeric value, said predefined alphanumeric value and said predefined table of encryption keys being also available to the second cryptographic encoder/decoder device;
   (iii) encrypting the first part session key with the first key exchange key to produce an encrypted first part session key; and
   (iv) transmitting the encrypted first part session key and the at least one first check character to the second cryptographic encoder/decoder device;
(b) at the second cryptographic encoder/decoder device:
   (i) receiving the encrypted first part session key and the at least one first check character;
   (ii) entering the predefined table of encryption keys with the at least one first check character to determine the first key exchange key used by the first cryptographic encoder/decoder device to encrypt the first part session key;
   (iii) decrypting the first part session key with the first key exchange key determined from the table in step (b)(ii);
   (iv) randomly generating a second part session key;
   (v) logically combining the first part session key and the second part session key to determine a session key;
   (vi) selecting a second key exchange key from the predefined table of encryption keys entered with at least one second check character that is determined as a function of the second part session key and the predefined alphanumeric value;
   (vii) encrypting the second part session key with the second key exchange key to produce an encrypted second part session key; and
   (viii) transmitting the encrypted second part session key and the at least one second check character to the first cryptographic encoder/decoder device;
(c) at the first cryptographic encoder/decoder device:
   (i) receiving the encrypted second part session key and the at least one second check character;
   (ii) entering the predefined table of encryption keys with the at least one second check character to determine the second key exchange key used by the second cryptographic encoder/decoder device to encrypt the second part session key;
   (iii) decrypting the second part session key with the second key exchange key determined from the table in step (c)(ii); and
   (iv) logically combining the first part session key and the second part session key to determine the session key; whereby,
(d) the first cryptographic encoder/decoder device uses the session key for encrypting messages transmitted to the second cryptographic encoder/decoder device, the second cryptographic encoder/decoder device uses the session key for decrypting those messages, and vice versa.

16. The method of claim 15, wherein:
(a) the step of determining the first check value comprises the steps of:
   (i) using the first part session encryption key to encrypt a predefined block of characters to produce an encrypted value;
   (ii) selecting at least a portion of a binary representation of the encrypted value to define a plurality of ASCII characters that comprise the first check value; and (b) the step of determining the second check value comprises the steps of:
  (i) using the second part session encryption key to encrypt the predefined block of characters to produce an encrypted value; and
  (ii) selecting at least a portion of a binary representation of the encrypted value to define a plurality of ASCII characters that comprise the second check value.

17. The method of claim 16, further comprising the steps of:
  (a) at the second cryptographic encoder/decoder device:
    (i) encrypting the predefined block of characters with the decrypted first part session encryption key to produce a test first check value;
    (ii) comparing the test first check value with the first check value received from the first cryptographic encoder/decoder device; and
    (iii) detecting an error if the test first check value is not identical to the first check value; and
  (b) at the first cryptographic encoder/decoder device:
    (i) encrypting the predefined block of characters with the decrypted second part session encryption key to produce a test second check value;
    (ii) comparing the test second check value with the second check value received from the first cryptographic encoder/decoder device; and
    (iii) detecting an error if the test second check value is not identical to the second check value.

18. The method of claim 17, further comprising the step of terminating the method if an error is detected in step (a)(iii) or in step (b)(iii) of that claim.

19. The method of claim 15, further comprising the steps of:
  (a) storing an identification code for the cryptographic encoder/decoder devices internally within each of said devices that uniquely identifies the respective devices, so that the stored identification code is inaccessible and can not be changed without making the device inoperative;
  (b) encrypting an identification code for the second cryptographic encoder/decoder device at the first cryptographic encoder/decoder device;
  (c) transmitting the encrypted identification code to the second cryptographic encoder/decoder device;
  (d) decrypting the identification code at the second cryptographic encoder/decoder device;
  (e) comparing the decrypted identification code at the second cryptographic encoder/decoder device with the identification code that is stored internally within it; and
  (f) automatically terminating communications with the first cryptographic encoder/decoder device if the decrypted identification code at the second cryptographic encoder/decoder device is not identical to the identification code that is stored internally within it.

20. The method of claim 15, further comprising the step of erasing the table of encryption keys in the event that an attempt is made to read out said table at either of the first and the second cryptographic encoder/decoder devices.

* * * * *

UNITED STATES PATENT AND TRADEMARK OFFICE
CERTIFICATE OF CORRECTION

PATENT NO. : 5,301,247
DATED : April 5, 1994
INVENTOR(S) : H. R. Rasmussen et al.

It is certified that error appears in the above-indentified patent and that said Letters Patent is hereby corrected as shown below:

| COLUMN | LINE | |
|---|---|---|
| 1 | 16 | "defined" should read --refined-- |
| 1 | 35 | after "any" insert --prior-- |
| 2 | 66 | after "first" insert --table-- |
| 5 | 59 | "threestate" should read --three-state-- |
| 13 (Claim 15 | 63 Line 9) | after "exchange" insert --key-- |

Signed and Sealed this

Sixteenth Day of August, 1994

Attest:

BRUCE LEHMAN

Attesting Officer        Commissioner of Patents and Trademarks